(12) United States Patent
Aboul-Magd et al.

(10) Patent No.: US 10,524,304 B2
(45) Date of Patent: Dec. 31, 2019

(54) MAC FRAME DESIGN OF WAKE-UP FRAME FOR WAKE-UP RECEIVER

(71) Applicants: Osama Aboul-Magd, Ottawa (CA); Jung Hoon Suh, Ottawa (CA); Kwok Shum Au, Ottawa (CA)

(72) Inventors: Osama Aboul-Magd, Ottawa (CA); Jung Hoon Suh, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/496,938

(22) Filed: Apr. 25, 2017

(65) Prior Publication Data

US 2018/0020501 A1 Jan. 18, 2018

Related U.S. Application Data

(60) Provisional application No. 62/362,473, filed on Jul. 14, 2016, provisional application No. 62/441,687, filed on Jan. 3, 2017.

(51) Int. Cl.
*H04W 52/02* (2009.01)
*H04W 76/28* (2018.01)
(Continued)

(52) U.S. Cl.
CPC ......... *H04W 76/28* (2018.02); *H04L 27/2602* (2013.01); *H04L 27/2692* (2013.01); *H04W 40/005* (2013.01); *H04W 52/0206* (2013.01); *H04W 52/0235* (2013.01); *H04W 72/0446* (2013.01); *H04W 84/12* (2013.01); *Y02D 70/00* (2018.01); *Y02D 70/10* (2018.01); *Y02D 70/14* (2018.01); *Y02D 70/142* (2018.01); *Y02D 70/20* (2018.01); *Y02D 70/26* (2018.01)

(58) Field of Classification Search
CPC . H04W 76/28; H04W 84/12; H04W 52/0206; H04W 40/005; H04W 52/0235; H04W 72/0446; H04L 27/2602; H04L 27/2692
See application file for complete search history.

(56) References Cited

U.S. PATENT DOCUMENTS 6,622,251 B1 * 9/2003 Lindskog ................ H04L 29/06
713/300
9,131,399 B2 * 9/2015 Liu .......................... H04W 8/26
(Continued)

FOREIGN PATENT DOCUMENTS

| CN | 1960365 A | 5/2007 |
| CN | 101087220 A | 12/2007 |

(Continued)

OTHER PUBLICATIONS

AMD, Magic Packet Technology, Nov. 1995, 6 pages.
(Continued)

*Primary Examiner* — Jay P Patel (57) ABSTRACT

Methods and systems for waking up an electronic device having a wake-up receiver circuit. A low-power wake-up signal is transmitted, including a wake-up frame including a simplified MAC header. The wake-up frame may also include a simplified frame body. Methods for recovering from failure of a wake-up receiver circuit are also described.

19 Claims, 7 Drawing Sheets

| Element ID | Length | Channel Switch Mode | New Channel Number | Channel Switch Count |
|---|---|---|---|---|
| Octets: 1 | 1 | 1 | 1 | 1 |

510

(51) Int. Cl.
*H04L 27/26* (2006.01)
*H04W 40/00* (2009.01)
*H04W 72/04* (2009.01)
*H04W 84/12* (2009.01)

(56) References Cited

U.S. PATENT DOCUMENTS

| | | | |
|---|---|---|---|
| 9,883,473 B2 | 1/2018 | Azizi et al. | |
| 2003/0031120 A1 | 2/2003 | Miyato et al. | |
| 2004/0233973 A1 | 11/2004 | Fullerton et al. | |
| 2005/0237161 A1* | 10/2005 | Lee | B60R 25/24 340/10.33 |
| 2006/0248208 A1* | 11/2006 | Walbeck | H04L 29/06 709/230 |
| 2007/0076683 A1 | 4/2007 | Chung et al. | |
| 2007/0174916 A1 | 7/2007 | Ching | |
| 2007/0195911 A1 | 8/2007 | Ochi | |
| 2007/0273484 A1 | 11/2007 | Cederlof et al. | |
| 2008/0056219 A1 | 3/2008 | Venkatachalam | |
| 2008/0122584 A1* | 5/2008 | Itasaki | G06K 19/0723 340/10.51 |
| 2008/0303636 A1 | 12/2008 | Chatte et al. | |
| 2009/0010191 A1* | 1/2009 | Wentink | H04W 52/0216 370/311 |
| 2010/0260159 A1 | 10/2010 | Zhang et al. | |
| 2010/0315954 A1* | 12/2010 | Singh | H04W 72/044 370/241 |
| 2011/0090977 A1 | 4/2011 | Zhong | |
| 2011/0122938 A1 | 5/2011 | Kameya | |
| 2011/0274193 A1 | 11/2011 | Yoon et al. | |
| 2012/0151028 A1* | 6/2012 | Lu | H04W 4/18 709/223 |
| 2012/0191995 A1* | 7/2012 | Naveh | G06F 1/3203 713/320 |
| 2012/0281696 A1* | 11/2012 | Pohlmann | H04L 12/12 370/390 |
| 2012/0321006 A1 | 12/2012 | Akita et al. | |
| 2013/0182795 A1* | 7/2013 | Cherian | H04L 25/02 375/316 |
| 2013/0223313 A1* | 8/2013 | Aboul-Magd | H04W 52/0209 370/311 |
| 2013/0230035 A1* | 9/2013 | Grandhi | H04W 48/16 370/338 |
| 2013/0279382 A1* | 10/2013 | Park | H04W 74/085 370/311 |
| 2013/0294431 A1 | 11/2013 | Wang et al. | |
| 2014/0029511 A1 | 1/2014 | Park et al. | |
| 2014/0112229 A1 | 4/2014 | Merlin et al. | |
| 2014/0153460 A1* | 6/2014 | Shrivastava | H04W 52/0225 370/311 |
| 2014/0185501 A1* | 7/2014 | Park | H04W 52/0238 370/311 |
| 2014/0192820 A1* | 7/2014 | Azizi | C12N 15/74 370/445 |
| 2014/0208138 A1* | 7/2014 | Homchaudhuri | G06F 1/3209 713/320 |
| 2014/0211680 A1* | 7/2014 | Seok | H04W 52/0216 370/311 |
| 2015/0103727 A1 | 4/2015 | Zhang et al. | |
| 2015/0146606 A1* | 5/2015 | Dong | H04W 52/0216 370/312 |
| 2015/0245290 A1 | 8/2015 | Liu | |
| 2015/0382283 A1* | 12/2015 | Wang | H04W 52/0216 370/328 |
| 2016/0007288 A1 | 1/2016 | Samardzija et al. | |
| 2016/0021656 A1* | 1/2016 | Park | H04B 7/24 370/329 |
| 2016/0057605 A1* | 2/2016 | Shellhammer | H04W 8/005 370/311 |
| 2016/0100414 A1 | 4/2016 | Guvenkaya et al. | |
| 2016/0295511 A1 | 10/2016 | Qi et al. | |
| 2016/0380712 A1 | 12/2016 | Levy | |
| 2017/0064634 A1* | 3/2017 | Van Horn | H04W 4/18 |
| 2017/0111820 A1* | 4/2017 | Wang | H04W 28/06 |
| 2017/0111865 A1* | 4/2017 | Seok | H04W 52/0229 |
| 2017/0111866 A1 | 4/2017 | Park et al. | |
| 2017/0134943 A1 | 5/2017 | Min et al. | |
| 2017/0136992 A1* | 5/2017 | Hamada | B60R 25/24 |
| 2017/0295538 A1* | 10/2017 | Zhang | H04W 48/16 |
| 2018/0007619 A1* | 1/2018 | Zhuang | H04L 67/16 |
| 2018/0007629 A1* | 1/2018 | Dorrance | H04L 69/22 |
| 2018/0013591 A1 | 1/2018 | Shafiee et al. | |
| 2018/0020397 A1 | 1/2018 | Aminaka et al. | |
| 2018/0176066 A1* | 6/2018 | Lim | H04L 1/00 |
| 2018/0184445 A1* | 6/2018 | Larmo | H04W 52/0216 |

FOREIGN PATENT DOCUMENTS

| | | |
|---|---|---|
| CN | 101237438 A | 8/2008 |
| CN | 103138949 A | 6/2013 |
| CN | 104272797 A | 1/2015 |
| CN | 104301973 A | 1/2015 |
| CN | 105144649 A | 12/2015 |
| CN | 105723780 A | 6/2016 |
| EP | 2843892 A1 | 3/2015 |

OTHER PUBLICATIONS

Wireshark, WakeOnLAN (WOL), retrieved on Febuary 2, 2019 from the internet: https://wiki.wireshark.org/WakeOnLAN. 2 pages.

U.S. Appl. No. 62/362,410, titled "Frame Format and Design of Wake-Up Frame for a Wake-Up Receiver", filed Jul. 14, 2016.

U.S. Appl. No. 62/362,455, titled "Security Design for a Wake Up Frame", filed Jul. 14, 2016.

U.S. Appl. No. 62/404,987, titled "Wake Up Radio Frame With Spectrum Spreading Based Single Carrier", filed Oct. 6, 2016.

U.S. Appl. No. 62/405,517, titled "Wake Up Radio Frame With OFDM Based OOK Data", filed Oct. 7, 2016.

U.S. Appl. No. 62/426,843, titled "Spectrum Spreading for OOK Based Single Barrier Wake Up Radio Frame", filed Nov. 28, 2016.

* cited by examiner

| Category | Spectrum Management Action | Channel Switch Announcement element | Secondary Channel Offset element | Mesh Channel Switch Parameters element | Wide Bandwidth Channel Switch element | New Transmit Power Envelope element |
|---|---|---|---|---|---|---|
| | | | | | Optional | Zero or more |

Octets: 1 | 1 | 5 | 0 or 3 | 0 or 6 | 0 or 5 | variable

| Element ID | Length | Channel Switch Mode | New Channel Number | Channel Switch Count |
|---|---|---|---|---|

Octets: 1 | 1 | 1 | 1 | 1

MAC FRAME DESIGN OF WAKE-UP FRAME FOR WAKE-UP RECEIVER

RELATED APPLICATIONS

The present application claims priority from U.S. provisional patent application No. 62/362,473, filed Jul. 14, 2016; and U.S. provisional patent application No. 62/441,687, filed Jan. 3, 2017, the entireties of which are hereby incorporated by reference.

FIELD

The present application relates to methods and systems for communicating with a wake-up receiver, including design of a wake-up frame detectable by a wake-up receiver.

BACKGROUND

In wireless communication, efficient use of the available power is one of the main goals of system design. Often, a wireless local area network (WLAN) device, such as in Internet of Things (IoT) applications, relies on a limited power supply (e.g., as supplied by rechargeable or non-rechargeable batteries). Examples of such a device may include sensor devices located in remote fields measuring some physical phenomenon, e.g., water level or temperature; and wearable devices measuring some bodily function, e.g., pulse rate.

Such a device may be designed to operate on a low duty cycle (e.g., communicating with an access point (AP) only once per day) and thus it may not be appropriate for its main WLAN receiver circuit to be always on. The limited power supply (e.g., battery) of the device may be quickly exhausted if not provided with an appropriate sleep mode for the WLAN receiver circuit and an appropriate wake-up mechanism. The wake-up mechanism may involve transmission of a wake-up signal from the AP to the device.

SUMMARY

A suitable wake-up frame (WUF) format is described herein for communicating wake-up signals to be received by a wake-up receiver circuit, separate from the WLAN receiver circuit. The present description describes examples of a simplified MAC header design suitable for a low-power wake-up frame to be received by the wake-up receiver circuit. The present description also describes examples of a simplified frame body design suitable for a low-power wake-up frame. For example, a format for carrying channel switching information is described. The present description also describes examples of a failure recovery method for recovering from possible failure of the wake-up receiver circuit.

In some aspects, the present disclosure describes a method of waking up an electronic device (ED) having a wake-up receiver circuit. The method includes transmitting a low-power wake-up signal, the wake-up signal comprising a wake-up frame including a simplified MAC header. The simplified MAC header includes a message type field identifying a message type of the wake-up frame, a message number field identifying a sequence number of the wake-up frame and a receiver identifier (RxID) field identifying an intended ED.

In some aspects, the present disclosure describes a method of waking up an electronic device (ED) having a wake-up receiver circuit. The method includes receiving a low-power wake-up signal, the wake-up signal comprising a wake-up frame including a simplified MAC header. The simplified MAC header includes a message type field identifying a message type of the wake-up frame, a message number field identifying a sequence number of the wake-up frame and a receiver identifier (RxID) field identifying an intended ED. The method also includes determining, using information in the RxID field, whether the ED is the intended ED. The method also includes, when the ED is the intended ED, causing the wake-up receiver circuit to transmit an internal signal to wake up a main receiver circuit of the ED.

In any of the above aspects/embodiments, the RxID field may contain a MAC address.

In any of the above aspects/embodiments, determining whether the ED is the intended ED may include comparing the MAC address contained in the RxID field with a MAC address of the ED.

In any of the above aspects/embodiments, the RxID field may contain an association identifier (AID).

In any of the above aspects/embodiments, the RxID field may further contain a BSS ID.

In any of the above aspects/embodiments, determining whether the ED is the intended ED may include comparing the AID contained in the RxID field with an AID of the ED.

In any of the above aspects/embodiments, the wake-up frame may further include a simplified frame body including one or more simplified information elements (IEs).

In any of the above aspects/embodiments, a length of the one or more simplified IEs may be variable.

In any of the above aspects/embodiments, there may be a plurality of simplified IEs, and at least one of the simplified IEs may have a length different from at least another one of the simplified IEs.

In any of the above aspects/embodiments, each simplified IE may include an IE identifier, an IE length value and carried information.

In any of the above aspects/embodiment, the one or more simplified IEs may include a simplified new channel number IE comprising a new channel number in the carried information.

In any of the above aspects/embodiments, the internal signal transmitted by the wake-up circuit may include information extracted from the one or more simplified IEs.

In any of the above aspect/embodiments, the internal signal transmitted by the wake-up circuit may include information indicating the new channel number.

In any of the above aspects/embodiments, the main receiver circuit may send an ACK signal on a channel identified by the new channel number.

In some aspects, the present disclosure describes a method of waking up an electronic device (ED) having a wake-up receiver circuit. The method includes transmitting a low-power wake-up signal. The wake-up signal includes a wake-up frame including a simplified frame body. The simplified frame body includes one or more simplified information elements (IEs). Each simplified IE includes an IE identifier, an IE length value and carried information.

In some aspects, the present disclosure describes a method of waking up an electronic device (ED) having a wake-up receiver circuit. The method includes receiving a low-power wake-up signal. The wake-up signal includes a wake-up frame including a simplified frame body. The simplified frame body includes one or more simplified information elements (IEs). Each simplified IE includes an IE identifier, an IE length value and carried information. The method includes causing the wake-up receiver circuit to transmit an internal signal to wake up a main receiver circuit of the ED.

In any of the above aspects/embodiments, the one or more simplified IEs may include a simplified new channel number IE comprising a new channel number in the carried information.

In any of the above aspects/embodiments, a length of the one or more simplified IEs may be variable.

In any of the above aspects/embodiments, there may be a plurality of simplified IEs, and at least one of the simplified IEs may have a length different from at least another one of the simplified IEs.

In any of the above aspects/embodiments, the internal signal transmitted by the wake-up circuit may include information extracted from the one or more simplified IEs.

In any of the above aspect/embodiments, the internal signal transmitted by the wake-up circuit may include information indicating the new channel number.

In some aspects, the present disclosure describes a method of waking up an electronic device (ED) having a wake-up receiver circuit. The method includes, in absence of a wake-up signal from the wake-up receiver circuit, after exceeding a predetermine timeout duration, waking a main receiver circuit from a sleep state.

In any of the above aspect/embodiments, the predetermined timeout duration may be set to be equal to or greater than an expected time duration between expected communications.

In any of the above aspect/embodiments, the method may further include transmitting a signal indicating possible failure of the wake-up receiver circuit.

In some aspects, the present disclosure describes an access point comprising a processor configured to execute computer-readable instructions to cause the access point to perform any of the above aspects/embodiments.

In some aspects, the present disclosure describes an electronic device (ED) comprising a wake-up receiver circuit and a main receiver circuit. The wake-up receiver circuit is configured to perform any of the above aspects/embodiments.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

A separate low-power wake-up receiver (WUR) circuit can be provided in an electronic device (ED), such as a WLAN device, and more specifically a station associated with an AP. The WUR receiver circuit is generally a low-power receiver circuit (typically, a simplified or reduced version of the main wireless receiver circuit) designed for receiving and detecting a wake-up signal. The WUR circuit communicates with the WLAN receiver circuit, or other equivalent circuit, of the device, so the WLAN receiver circuit may sleep and conserve power until the WUR circuit wakes up the WLAN receiver circuit. The WUR circuit wakes up the WLAN receiver circuit, or other equivalent circuit, when the WUR circuit detects a wake-up signal from an AP (typically, the AP associated with the WLAN device).

A suitable wake-up frame (WUF) design is described herein for communicating wake-up signals to the WUR circuit. The present description describes example embodiments of a WUF, examples of the MAC header, and examples of the field body. An example method for recovering from failure of the WUR circuit is also described.

Example embodiments described herein may be implemented using IEEE 802.11 technology.

Figure 1:
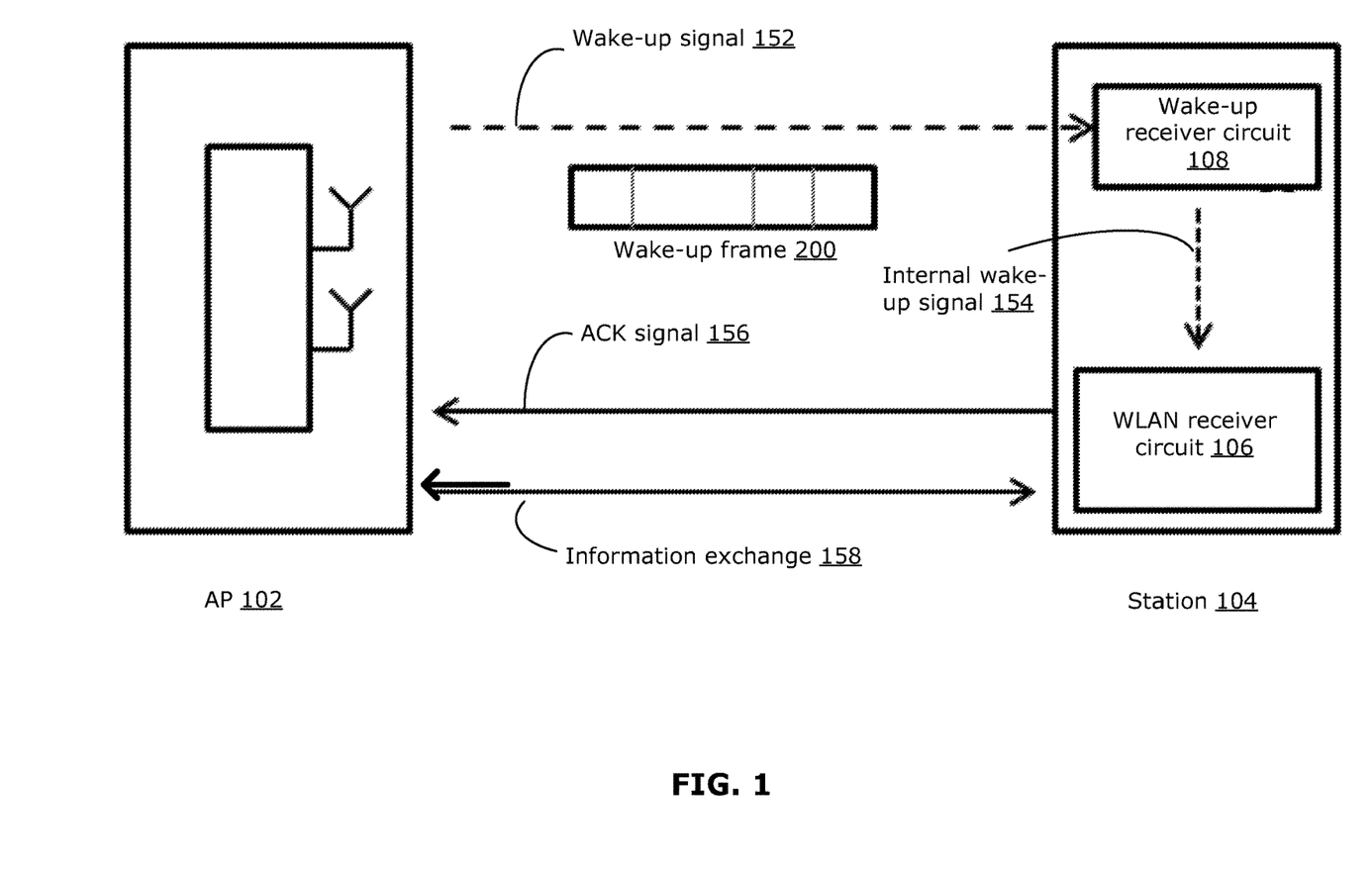
FIG. 1 is a block diagram illustrating communications between an AP and an example station having a wake-up receiver circuit.

FIG. 1 is a schematic diagram illustrating an example AP 102 and an example station 104 (e.g., a low duty cycle WLAN device or other electronic device) associated with the AP 102. The example station 104 includes a WLAN receiver circuit 106 (e.g., a Wi-Fi receiver) and a WUR circuit 108 (also referred to simply as a WUR). Although FIG. 1 shows a WLAN receiver circuit 106, the present disclosure may be applicable to other circuits, including other wireless receiver circuits, which may benefit from a wake-up mechanism.

FIG. 1 illustrates a set of example signals that may be communicated for waking up a sleeping WLAN receiver circuit 106. The AP 102 may send a wake-up signal 152, carrying a WUF 200 (described further below) to the station 104. The WUF 200 is detected by the WUR circuit 108, and the WUR circuit 108 sends an internal wake-up signal 154 to the WLAN receiver circuit 106, waking up the WLAN receiver circuit 106 if the WLAN receiver circuit 106 is in sleep mode. The WLAN receiver circuit 106 then sends an ACK signal 156 back to the AP 102. Appropriate information exchange 158 between the AP 102 and the station 104 (via the WLAN receiver circuit 106) may then take place. After the information exchange 158 is finished, the WLAN receiver circuit 106 may return to the sleep state. The wake-up signal 152, internal ACK signal 156 and information exchange 158 may all be communicated over the same channel.

Figure 2:
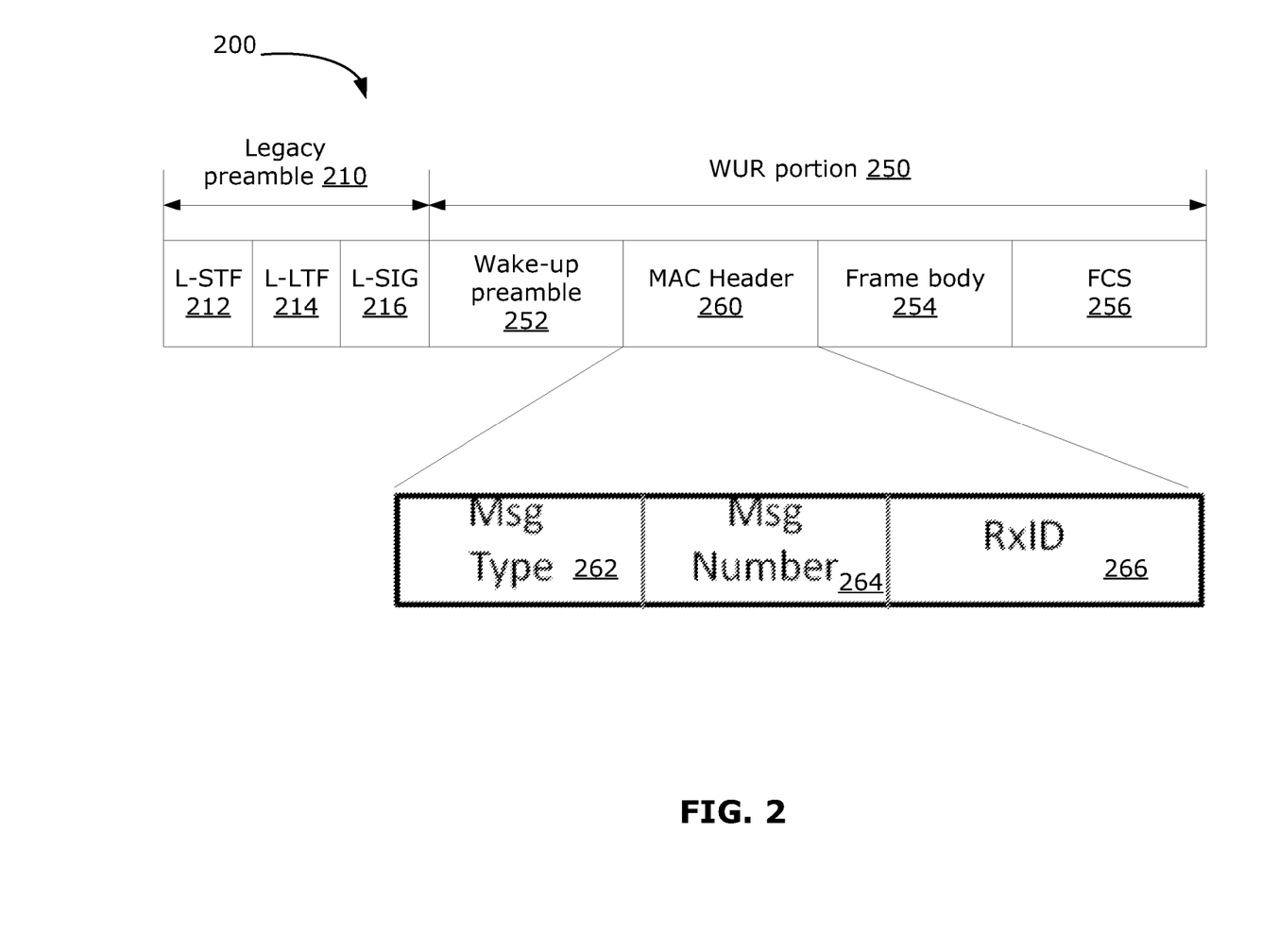
FIG. 2 illustrates an example frame format for an example wake-up frame.

Example embodiments described herein may use orthogonal frequency-division multiplexing (OFDM) technology for the WUF 200. An example frame format for an example WUF 200 is shown in FIG. 2. The WUF 200 may include a legacy preamble. The non-legacy portions of the WUF 200 may be referred to as the WUR portion 250 of the WUF 200. The legacy preamble 210 may include a legacy short training field (L-STF) 212, a legacy long training field (L-LTF) 214, and a legacy signal (L-SIG) field 216. The WUR portion 250 includes a wake-up preamble 252, which may include a WUR short training field (WUR-STF) and/or WUR long training field (WUR-LTF) and a WUR signal (WUR-SIG) field. The WUR portion 250 further includes a MAC header 260, a frame body 254 and a frame check sequence (FCS) 256.

The example WUF 200 starts with the IEEE 802.11 legacy preamble 210. The legacy preamble 210 is used for coexistence with other IEEE 802.11 devices operating in the same band as the WUR, however in some examples the legacy preamble 210 may be omitted, for example as discussed in U.S. provisional application No. 62/362,410, titled "Frame Format and Design of Wake-Up Frame for a Wake-Up Receiver", filed Jul. 14, 2016. The legacy preamble 210 is transmitted at the legacy bandwidth (generally 20 MHz and using Modulation and Coding Scheme (MCS) 0, in accordance with legacy standards) to be decoded by other devices. The legacy preamble 210 serves to silence all non-destination WLAN devices during the transmission of the WUF 200. The WUR portion 250 may be narrower in bandwidth (BW) than the legacy preamble 210, for example the WUR portion 250 may be 5 MHz in BW, although other BW may also be suitable (e.g., 1.25 MHz), or the WUR portion 250 may have the same BW as the legacy preamble, for example as discussed in the above-noted U.S. provisional application No. 62/362,410.

In some examples, the station 104 needs to inform the AP 102 when the WLAN receiver circuit 106 of the station 104 enters the sleep state. This may involve the station 104 first informing the AP 102 that the station 104 has WUR capability. This capability declaration may be done at the time the station 104 initially associates with the AP 102, for example using an appropriate capability information element. Then, when the WLAN receiver circuit 106 of the station 104 is to enter the sleep state, the station 104 can announce this event to the AP 102 using appropriate communications, such as using the Power Management bit in the Frame Control field of the 802.11 MAC frame.

Example formats for the MAC header 260 and the frame body 254 are described herein. The MAC header 260 and the frame body 254 for the WUR portion 250 may be simplified, for example as discussed below, in order to keep the WUF 200 as a low-power signal.

Because the wake-up signal 152 is intended to be a low-power signal, the use of the standard IEEE 802.11 MAC header in the WUF 200 may not be suitable because of its length. The standard IEEE 802.11 MAC header typically introduces more than 40 bytes of overhead, which may be contrary to the desire for a low-power signal. One or more, or all, of the fields of the standard IEEE 802.11 MAC header may not be needed for the WUF 200. For example, the Duration/ID version field and HT Control field, among many other fields typically found in a standard IEEE 802.11 MAC header, may be omitted. FIG. 2 shows an example format for the MAC header 260 that may be suitable for the WUF 200. The example format for the MAC header 260, as shown in FIG. 2, may be much shorter in length (thus enabling a low-power signal), yet still provide the minimum information needed by the WUR circuit 108.

In the example shown in FIG. 2, the MAC header 260 includes, but is not limited to, a message type (Msg Type) field 262, a message number (Msg Number) field 264, and a receiver identifier (RxID) field 266. This example MAC header 260 may be considered simplified MAC header 260 compared to standard IEEE 802.11 MAC headers. More fields may be introduced to carry more information, as appropriate.

The Msg Type field 262 may be used to indicate the type of signal being transmitted. For example, the Msg Type field 262 may indicate whether the frame is a wake-up signal 152 used to wake up the WLAN receiver circuit 106, or whether the frame is a frame sent by the AP 102 for the management of the relationship between the AP 102 and the WUR circuit 108 in one or more stations 104. The length of the Msg Type field 262 can be a single bit sufficient to define two frame types, e.g., a wake-up frame type and a management frame type. An example of a management frame type, for channel switching operations, is described below. In some examples, a frame may contain both information to wake up the WLAN receiver circuit 106 as well as management information—this may be considered a third frame type. Where there are more than two frame types, the Msg Type field 262 may be increased in length and/or complexity as necessary.

The Msg Number field 264 contains a unique number identifying the order of the transmitted signal. The Msg Number field 264 may play a similar role to a sequence number of the frame. The Msg Number field 264 allows the WUR circuit 108 to determine whether a frame is current or old, and to discard old frames that may arrive late. For example, the length of the Msg Number field 264 can be set to one byte. In some examples, the length of the Msg Number field 264 can be set to 7 bits so that the Msg Type field 262 and the Msg Number field 264 together occupy a single byte. These field lengths are provided as examples only, and in other examples the Msg Type field 262 and/or the Msg Number field 264 may be longer or shorter, as appropriate.

The RxID field 266 contains an identifier used to identify the intended station 104. The RxID field 266 should allow for the case where the AP 102 is intended to wake up two or more stations 104. The RxID field 266 may contain two or more identifiers, for example. The RxID field 266 may also allow for broadcast of a WUF 200. For example, a reserved value of the RxID field 266 may be reserved for the purpose of group transmissions (e.g., similarly to the use of the all-one MAC address as a broadcast address).

To address a specific station 104, the value of the RxID field 266 may be set equal to the association ID (AID) assigned by the AP 102 to that specific station 104 during initial association of the station 104 with the AP 102. However, the AID value is not globally unique (e.g., two different APs 102 may use the same AID value for two different stations 104). To address this, the BSS Color (also referred to as BSS ID) field in the wake-up preamble 252 (e.g., in the WUR-SIG field) may be used. Alternatively the BSS Color field can be included in the MAC header 260.

Figure 3:
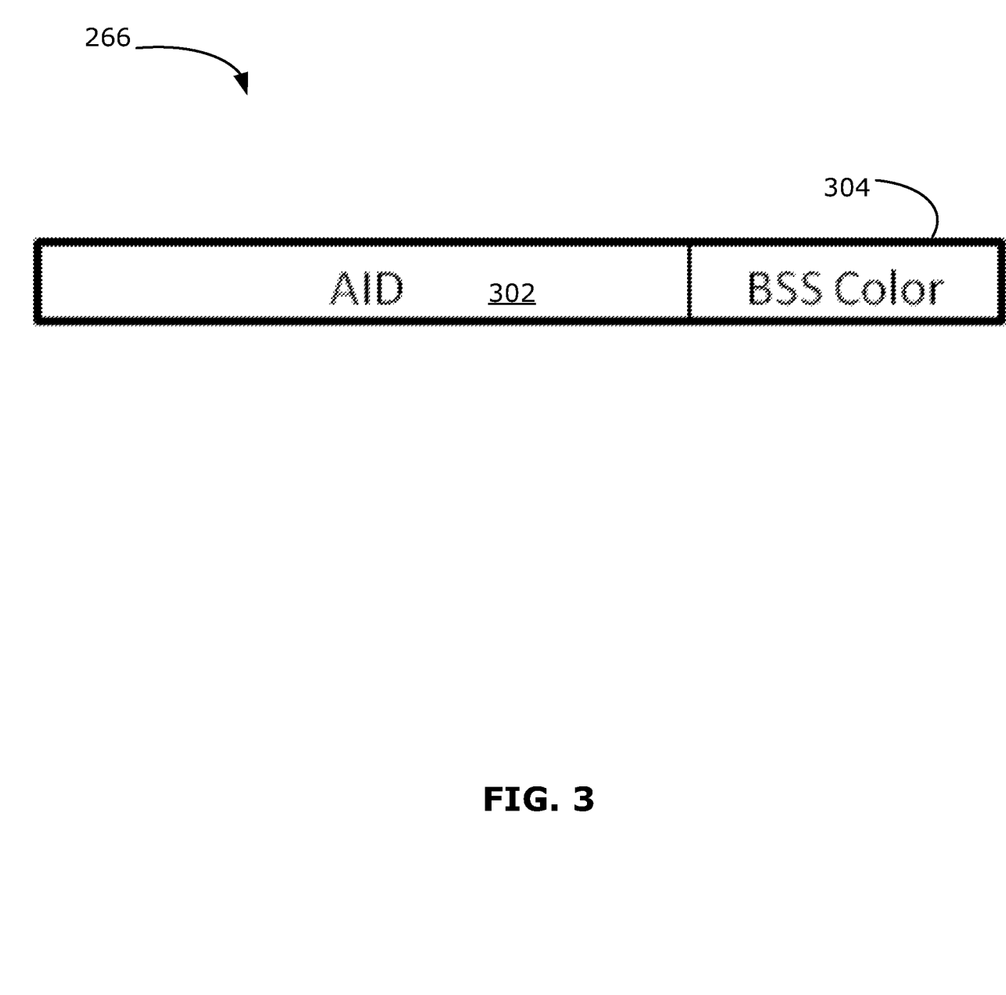
FIG. 3 illustrates an example format for the station identifier in an example MAC header.

FIG. 3 illustrates an example format of the RxID field 266, having an AID field 302 to contain the AID value. The RxID field 266 may be two bytes long, in accordance with IEEE 802.11 standard for AID. The AID value is 11-bit long and the remaining five bits can be used as a BSS Color field 304 to contain the value of the BSS Color.

In the above-described example where AID is used for identification of the station 104, the MAC header 260 of the WUF 200 may be as short as three bytes, specifically one byte for the Msg Type field 262 and the Msg Number field 264, and two bytes for the RxID field 266.

In other examples, the value of the RxID field 266 may be set to the MAC address of the intended station 104. In this case, the global uniqueness of the MAC address is used to uniquely identify the intended station 104, hence disambiguation (e.g., using the BSS Color) is not needed. However, more bits are needed, because the MAC address length is typically six bytes, compared to the use of AID and BSS Color together as described above.

In examples where the MAC address is used for station identification, the length of the MAC header 260 may be seven bytes, specifically one byte for the Msg Type field 262 and the Msg Number field 264, and six bytes for the MAC address. However, this length would still be shorter than the length of the standard IEEE 802.11 MAC header. The method selected for station identification (e.g., using AID or using MAC address) may be chosen according to the desired power level of the WUF 200, for example.

When a station 104 receives the WUF 200, the station 104 decodes and processes the WUF 200. If the station 104 is a legacy device that is not the intended recipient of the WUF 200, the legacy preamble 210 (if present) may serve to silence the legacy device. Assuming the station 104 has WUR capabilities, the station 104 proceeds to process the WUR portion 250 of the WUF 200. This may include the station 104 using information contained in the RxID field 266 to determine whether it is the intended recipient of the WUF 200. For example, the station 104 may compare the AID value contained in the RxID field 266 with the AID value assigned to and stored by the station 104 during initial association with the AP 102. Alternatively, the station 104 may compare the MAC address contained in the RxID field 266 to its own MAC address.

If the station 104 determines that it is not the intended recipient, the WUF 200 is discarded and, if the station 104 is in sleep mode, the station 104 remains in sleep mode. If the station 104 determines that it is the intended recipient, the station 104 continues to process the WUF 200. This may include processing the remainder of the WUR portion 250 and ultimately causing its WLAN receiver circuit 106 to wake up.

Figure 4:
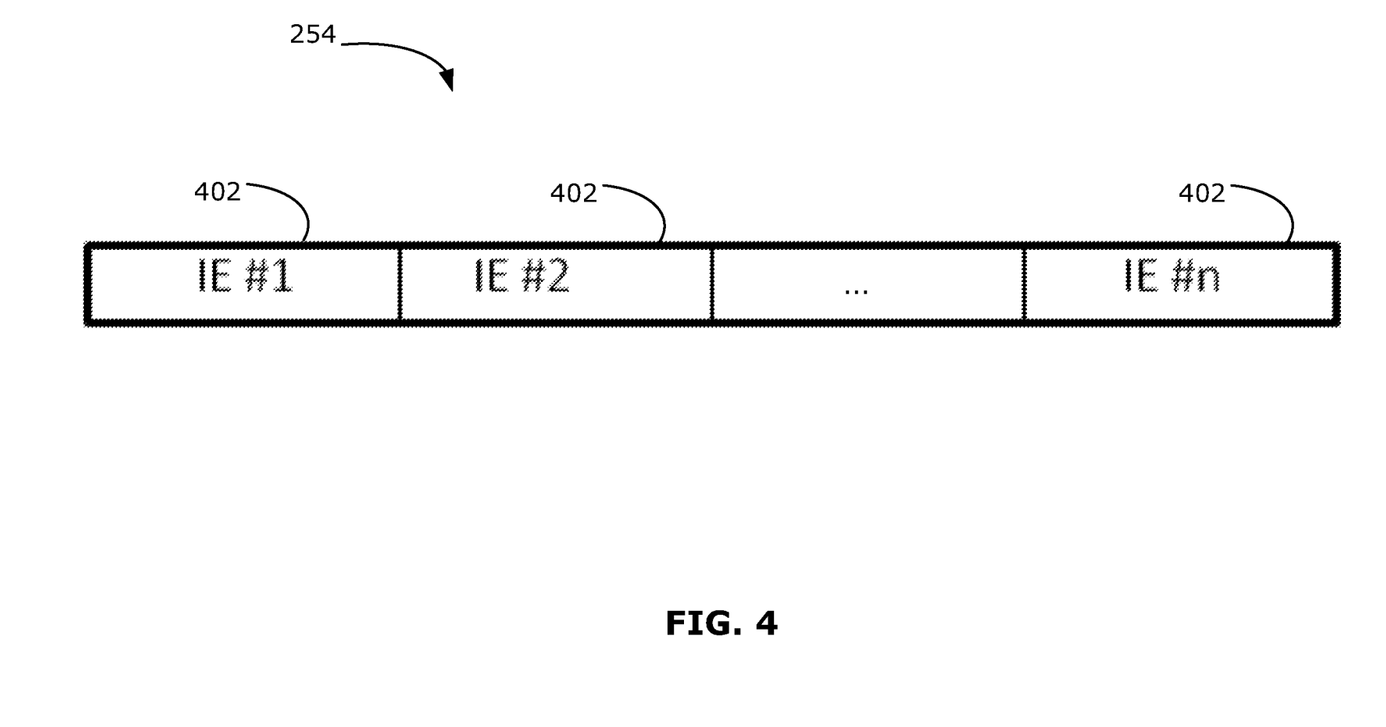
FIG. 4 illustrates an example format for the frame body in an example wake-up frame.

An example format for the frame body 254 of the WUF 200 is shown in FIG. 4. This example frame body 254 may be considered a simplified frame body 254 compared to conventional frame bodies. In this example, the frame body 254 includes one or more Information Elements (IE) 402. In the example shown, the IEs 402 are numbered 1 to n. In some examples, there may be an upper limit to the number of IEs 402 that may be carried in a single WUF 200, in order to keep the WUF 200 relatively short and low-powered. The IEs 402 may be used to communicate information from the AP 102 to the station 104, including any management information necessary for the proper operation of the WUR circuit 108 and/or the station 104. An IE 402 includes an IE identifier (e.g., the IE number), an IE length value (indicating the length of the IE 402), and the actual information (e.g., data) carried by the IE 402. For example, an IE 402 may provide information related to channel switching, as discussed further below. The length of an IE 402 may be fixed or variable. It should also be noted that where there is more than one IE 402 carried in a single WUF 200, the lengths of the IEs 402 within the WUF 200 may be the same or may be different.

Referring back to FIG. 2, the WUF 200 ends with the FCS 256. In conventional IEEE 802.11 frames, a 32-bit FCS is used, which may also be used in the example WUF 200. In other examples, in order to keep the length of the WUF 200 relatively short, cyclic redundancy check (CRC)-8 (having 8 bits) or CRC-12 (having 12 bits) may be used for data protection.

Figure 5A:
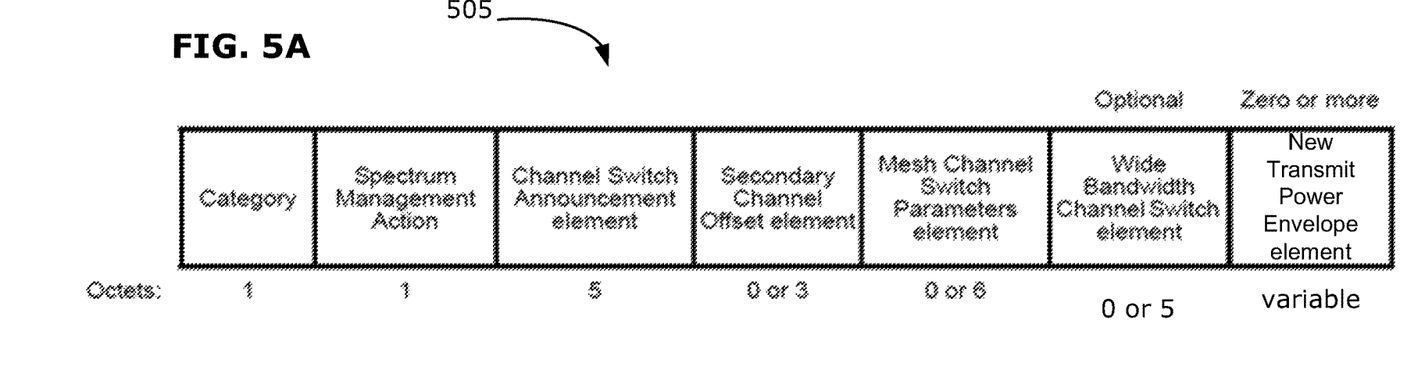
FIG. 5A illustrates an example channel switch announcement frame.
Figure 5B:
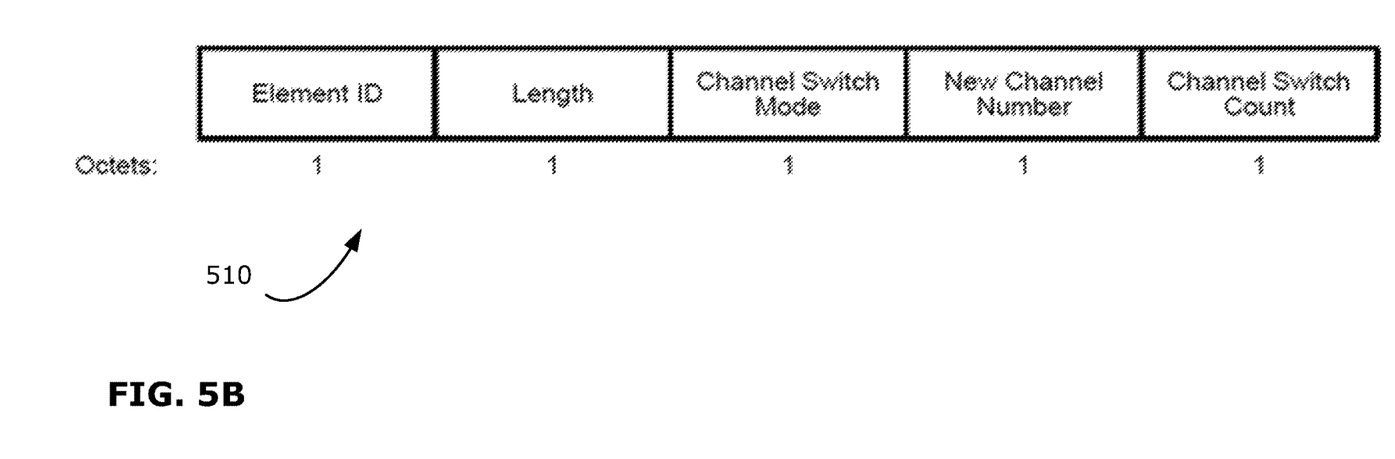
FIG. 5B illustrates an example channel switch announcement element.
Figure 6:
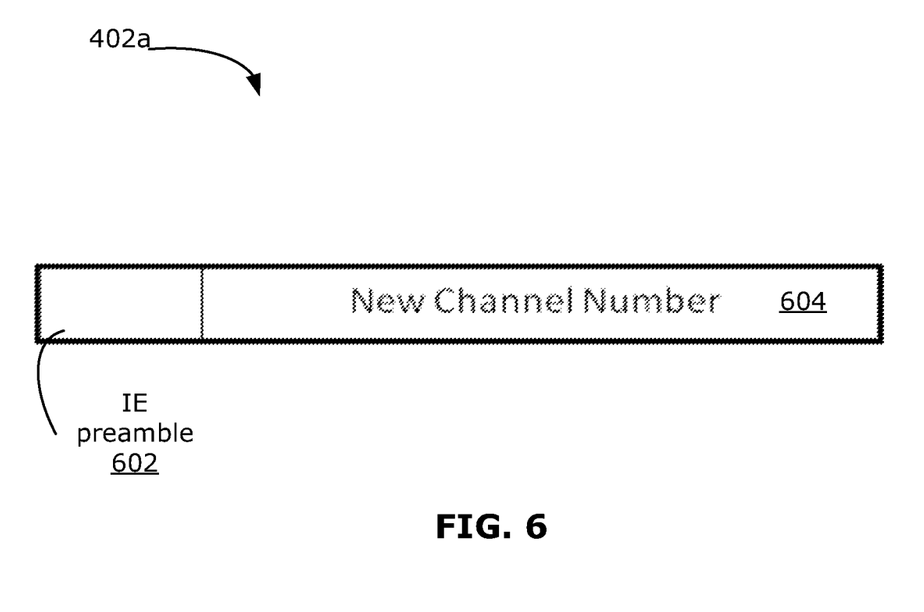
FIG. 6 illustrates an example format for an example information element in an example wake-up frame.

An example of the management information (e.g., which may be carried in an IE 402) that may be sent from the AP 102 to the station 104, via the WUF 200, is now discussed with reference to FIGS. 5A, 5B and 6.

In some examples, the IEEE 802.11 station 104 associated with the WUR circuit 108 may be any of the existing/legacy IEEE 802.11 devices, e.g. 802.11a/b/g/n/ac. Because the WUR portion 250 may be transmitted using a narrower BW (e.g., 5 MHz or 1.25 MHz) than legacy signals (e.g., 20 MHz), the WUR circuit 108 may be operational on a single 20 MHz channel. If the WUR circuit 108 is operating on the same channel(s) as those used for data exchange (in which case the WUR circuit 108 may be referred to as an in-band WUR) then the primary channel may also be used for transmission of the wake-up signal 154.

Alternatively, the WUR circuit 108 may use a different 20 MHz channel other than those used for data exchange by the main WLAN receiver circuit 106 (in which case the WUR circuit 108 may be referred to as an out-of-band WUR).

During normal operation, the AP 102 may switch its operating channel for various reasons (e.g., channel degradation). This channel switch information needs to be propagated to the station 104. Conventionally, in the absence of the WUR circuit 108, the AP 102 makes use of a Channel Switch Announcement element 510 (see FIG. 5B) and Channel Switch Announcement frame 505 (see FIG. 5A) to inform associated station(s) 104 of the pending channel switch. The Channel Switch Announcement element 510 and Channel Switch Announcement frame 505 are typically received by the main WLAN receiver circuit 106. However, when the presently described wake-up mechanism is in use, and the main WLAN receiver circuit 106 is in the sleep state, the AP 102 instead communicates with the WUR circuit 108. Thus, the channel switch information needs to be propagated from the AP 102 to the WUR circuit 108, which in turn wakes up the WLAN receiver circuit 106 and provides this information to the WLAN receiver circuit 106. Thus, where there is a WUR circuit 108 and the main WLAN receiver circuit 106 is in the sleep state, the channel switch information needs to be included in the WUF 200, for example as an IE 402 in the frame body 254.

An example approach is to include the Channel Switch Announcement element 510 in the frame body 254 of the WUF 200. In this case, the WUR circuit 108 will recognize the new channel number by the inclusion of the Channel Switch Announcement element 510 and can provide this information to the WLAN receiver circuit 106. However, this may require a relatively long IE 402 in the frame body 254, which may be contrary to the desire for a low-power WUF 200.

Another example approach may help to keep the WUF 200 short. In this example approach, instead of including the entire Channel Switch Announcement element 510, only the new channel number is provided in the frame body 254. FIG. 6 shows an example IE 402a that may be included in the frame body 254 to provide this simplified information. The example IE 402a shown in FIG. 6 includes an IE preamble 602 (e.g., including the IE identifier and IE length value) and the New Channel Number information 604 indicating the channel switch as the actual information carried by the IE 402a. In this example, there is no need to include other information typically found in the Channel Switch Announcement frame 505, such as the secondary channel offset element, and others. In this example, the AP 102 sends a wake-up signal 152 to the WUR circuit 108, where the WUF 200 contains the simplified IE 402a in the frame body 254 that carries only the New Channel Number information 604.

The recipient station 104 processes the WUF 200 (e.g., including identifying itself as the intended recipient, using the RxID field 266). Processing of the WUF 200 may include extracting the new channel information contained in the frame body 254. When the WUR circuit 108 sends the internal wake-up signal 154 to the WLAN receiver circuit 106, the internal wake-up signal 154 may also include information indicating the new channel number. Thus, when the WLAN receiver circuit 106 is awakened by the internal wake-up signal 154, the WLAN receiver circuit 106 can send its ACK signal 156 on the new channel, using appropriate legacy format for example. After receiving the ACK signal 156 from the WLAN receiver circuit 106, the AP 102 can send the detailed channel switch information as usual (e.g., as typically provided via the Channel Switch Announcement element 510 and the Channel Switch Announcement frame 505) to inform the WLAN receiver circuit 106 of the other information related to the channel switch. If the ACK signal 156 is not received by the AP 102, then the AP 102 may transmit the wake-up signal 152 again, including the simplified IE 402a, until it receives the ACK signal 156 from the WLAN receiver circuit 106, similarly to the IEEE 802.11 standard where there is no WUR circuit 106.

In other examples, other information, such as information related to any other operation change (e.g., change in timing information) in the AP 102, can be communicated to the station 104 via the WUR circuit 108 by similarly transmitting a reduced amount of information (e.g., minimum required information) as a simplified IE 402 in the frame body 254 of the WUF 200. In some examples, the AP 102 may need to indicate to the WLAN receiver circuit 106 the duration of the transmission opportunity (TXOP) assigned to the station 104. The TXOP information may be transmitted to the station 104 as part of the wake-up signal 152, for example as an IE 402 in the frame body 254 of the WUF 200.

Because the WUR circuit 108 is relied on to wake up the main WLAN receiver circuit 106, it would be desirable for the WUR circuit 108 be highly reliable so that failure is a very rare event. However, it should also be possible to recover from a rare failure. For example, the station 104 may be subject to harsh conditions (e.g., where the station 104 is used for agriculture purposes in an outdoor environment), which may lead to failure conditions.

Figure 7:
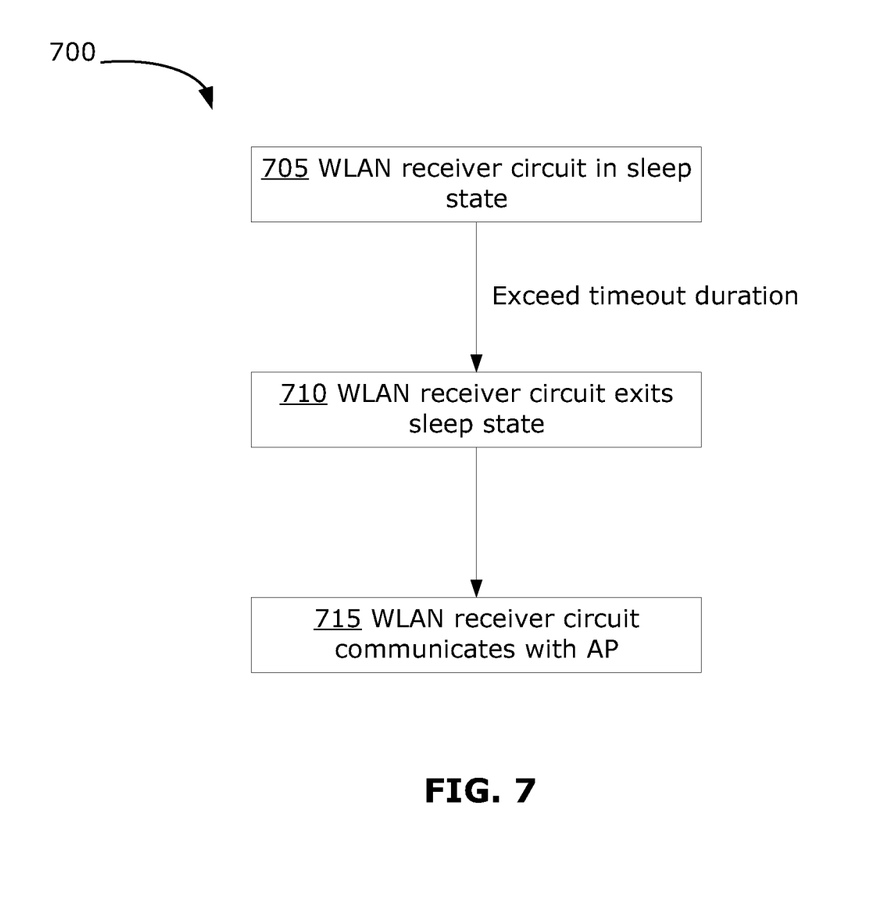
FIG. 7 is a flowchart illustrating an example failure recovery method.

An example failure recovery method 700 is illustrated in FIG. 7. This example method 700 may be implemented in any suitable station 104 in which the WLAN receiver circuit 106 (or other equivalent circuit) is normally woken from the sleep state by a separate WUR circuit 108.

At 705, the WLAN receiver circuit 106 is in the sleep state. When the WUR circuit 108 is normally functioning, the WLAN receiver circuit 106 exits the sleep state when it receives the internal wake-up signal 154 from the WUR circuit 108.

To account for the possible failure of the WUR circuit 108, the WLAN receiver circuit 106 may be configured to automatically wake up if the internal wake-up signal 154 is not received after a predetermined duration of time (e.g., using a preset timeout alarm). The duration of the timeout may be designed to avoid unnecessarily frequent wake-ups and at the same time reducing the possibility of missing frames stored at the AP 102 which are intended for the station 104. For example, the timeout duration may be set to be equal to or just slightly greater than the time between expected communications between the AP 102 and the station 104. For example, where the AP 102 and station 104 are expected to communicate with each other on an hourly basis, the timeout duration may be set to be one hour or 70 minutes.

Thus, after the preset timeout duration is exceeded, at 710, the WLAN receiver circuit 106 exits the sleep state, without receiving the internal wake-up signal 154 from the WUR circuit 108.

At 715, the WLAN receiver circuit 106 can then communicate as usual with the AP 102. In some examples, the WLAN receiver circuit 106 may send information to the AP 102 to indicate possible failure of the WUR circuit 108. This may also be communicated as capability information. This information may prevent the AP 102 from continuing to send wake-up signals 152 to an unresponsive WUR circuit 108, and additionally may trigger other corrective action (e.g., triggering an alert for maintenance to be carried out). Because this failsafe automatic wake-up can be classified as a regular wake-up, the typical main IEEE 802.11 power save procedure can be used and can allow the station 104 to send a PS-Poll message to the AP 102 to request its frames.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of waking up an electronic device (ED) having a wake-up receiver circuit, the method comprising:
   transmitting a low-power wake-up signal detectable by a wake-up circuit of an intended ED, the wake-up signal comprising a wake-up frame including a simplified MAC header;
   wherein the simplified MAC header comprises a message type field identifying a message type of the wake-up frame, a message number field identifying a sequence number of the wake-up frame and a receiver identifier (RxID) field identifying the intended ED.

2. The method of claim 1 wherein the RxID field contains a MAC address.

3. The method of claim 1 wherein the RxID field contains an association identifier (AID).

4. The method of claim 3 wherein the RxID field further contains a BSS ID.

5. The method of claim 1, wherein the wake-up frame further comprises a simplified frame body including one or more simplified information elements (IEs).

6. The method of claim 5, wherein each simplified IE comprises an IE identifier, an IE length value and carried information.

7. The method of claim 5, wherein length of the one or more simplified IEs is variable.

8. The method of claim 5, wherein the wake-up frame comprises a plurality of simplified IEs, and at least one of the simplified IEs has a length different from at least another one of the simplified IEs.

9. The method of claim 5, wherein the one or more simplified IEs include a simplified new channel number IE comprising a new channel number in the carried information.

10. The method of claim 5, wherein the message type field identifies the message type to be a frame type that is both a wake-up frame and a management frame.

11. A method of waking up an electronic device (ED) having a wake-up receiver circuit, the method comprising:
transmitting a low-power wake-up signal detectable by a wake-up circuit of an intended ED, the wake-up signal comprising a wake-up frame including a simplified frame body;
wherein the simplified frame body comprises one or more simplified information elements (IEs), each simplified IE comprising an IE identifier, an IE length value and carried information; and
wherein at least one of the one or more simplified IEs include a simplified new channel number IE comprising a new channel number in the carried information.

12. The method of claim 11, wherein length of the one or more simplified IEs is variable.

13. The method of claim 11, wherein the simplified frame body comprises a plurality of simplified IEs, and at least one of the simplified IEs has a length different from at least another one of the simplified IEs.

14. A method of waking up an electronic device (ED) having a wake-up receiver circuit, the method comprising:
receiving a low-power wake-up signal, the wake-up signal comprising a wake-up frame including a simplified MAC header;
wherein the simplified MAC header comprises a message type field identifying a message type of the wake-up frame, a message number field identifying a sequence number of the wake-up frame and a receiver identifier (RxID) field identifying an intended ED;
in response to detecting, by the wake-up circuit, the wake-up frame of the low-power wake-up signal, transmitting, by the wake-up circuit, an internal wake-up signal to a main receiver circuit of the ED; and
in response to receiving the internal wake-up signal at the main receiver circuit, waking up the ED from sleep mode.

15. The method of claim 14, further comprising:
when the ED is in the sleep mode and the internal wake-up signal is not received for a time period exceeding a predetermine timeout duration, waking the main receiver circuit from a sleep state.

16. The method of claim 14, wherein the wake-up frame further comprises a simplified frame body including one or more simplified information elements (IEs).

17. The method of claim 16, wherein each simplified IE comprises an IE identifier, an IE length value and carried information.

18. The method of claim 16 wherein the one or more simplified IEs include a simplified new channel number IE comprising a new channel number in the carried information.

19. The method of claim 16, wherein the internal wake-up signal includes information indicating the new channel number, the method further comprising:
transmitting, by the main receiver circuit, an acknowledgement signal using the new channel number.

* * * * *